(12) United States Patent
Jia et al.

(10) Patent No.: US 11,494,860 B2
(45) Date of Patent: *Nov. 8, 2022

(54) SYSTEMS AND METHODS FOR IMPLEMENTING SEARCH AND RECOMMENDATION TOOLS FOR ATTORNEY SELECTION

(71) Applicant: Clara Analytics, Inc., Santa Clara, CA (US)

(72) Inventors: Zhe Jia, Sunnyvale, CA (US); Hari Sarang Nathan, New York, NY (US); Shengnan Li, Los Angeles, CA (US)

(73) Assignee: Clara Analytics, Inc., Santa Clara, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/243,028

(22) Filed: Apr. 28, 2021

(65) Prior Publication Data
US 2021/0248701 A1   Aug. 12, 2021

Related U.S. Application Data

(63) Continuation of application No. 16/696,915, filed on Nov. 26, 2019, now Pat. No. 11,017,489.

(Continued)

(51) Int. Cl.
*G06Q 50/18* (2012.01)
*G06N 20/00* (2019.01)
*G06Q 30/02* (2012.01)

(52) U.S. Cl.
CPC ............ *G06Q 50/18* (2013.01); *G06N 20/00* (2019.01); *G06Q 30/0282* (2013.01)

(58) Field of Classification Search
CPC ............... G06Q 50/18; G06Q 30/0282; G06Q 30/0627; G06N 20/00; G06N 20/20
See application file for complete search history.

(56) References Cited

U.S. PATENT DOCUMENTS 5,875,431 A * 2/1999 Heckman ........... G06Q 30/0204
                                                              705/7.33
8,219,424 B2 * 7/2012 Scalet .................... G06Q 10/10
                                                                  705/2

(Continued)

FOREIGN PATENT DOCUMENTS

| CN | 102622375 A | 8/2012 | |
| WO | WO 2014/149322 A1 | 9/2014 | |
| WO | WO-2014149322 A1 * | 9/2014 | ............. G06Q 50/18 |

OTHER PUBLICATIONS

Colley, W.N., "Colley's Bias Free College Football Ranking Method: The Colley Matrix Explained," Princeton University, Apr. 5, 2003, pp. 1-23 (Year: 2003).*

(Continued)

*Primary Examiner* — Carrie S Gilkey
(74) *Attorney, Agent, or Firm* — Fenwick & West LLP

(57) ABSTRACT

A system and a method disclosed herein provides search and recommendation mechanisms for selecting attorneys. In an embodiment, a processor identifies a claim litigated by a candidate attorney. The processor uses historical claim data and a claim score for an attorney who opposed the candidate attorney when litigating the claim to determine a claim score for the candidate attorney. The processor then uses the candidate attorney claim score to recalculate the opposing attorney claim score, and checks to see whether the claim scores have converged. If the scores have not converged, the processor iteratively recalculates the claim scores of the candidate attorney and the opposing attorney until the scores converge. Finally, the candidate attorney claim score is used to determine an overall score for the candidate attorney which can be compared against the scores of other attorneys and used for attorney search and recommendation.

20 Claims, 10 Drawing Sheets

Related U.S. Application Data

(60) Provisional application No. 62/773,133, filed on Nov. 29, 2018.

(56) References Cited

U.S. PATENT DOCUMENTS

| | | | | |
|---|---|---|---|---|
| 8,554,603 | B1* | 10/2013 | Paulmann | G06Q 30/04 705/40 |
| 2002/0038233 | A1* | 3/2002 | Shubov | G06Q 40/04 705/26.4 |
| 2004/0103005 | A1* | 5/2004 | Wahlbin | G06Q 40/08 705/1.1 |
| 2005/0240578 | A1 | 10/2005 | Biederman et al. | |
| 2006/0190490 | A1* | 8/2006 | Ritchey | G06F 16/248 |
| 2007/0192130 | A1* | 8/2007 | Sandhu | G06Q 10/1053 705/347 |
| 2009/0307237 | A1* | 12/2009 | Britton | G06Q 10/10 |
| 2012/0303497 | A1* | 11/2012 | Derry | G06Q 10/10 705/30 |
| 2013/0211989 | A1* | 8/2013 | Derry | G06Q 10/10 705/35 |
| 2014/0012623 | A1* | 1/2014 | Paulmann | G06Q 10/00 705/7.29 |
| 2015/0262318 | A1* | 9/2015 | Unwin | G06Q 10/0639 705/311 |
| 2015/0278972 | A1* | 10/2015 | McGuire | G06Q 30/0627 705/26.63 |
| 2015/0371348 | A1* | 12/2015 | Magrath | G06Q 10/10 705/311 |
| 2016/0321716 | A1* | 11/2016 | Ravikant | G06Q 30/0601 |
| 2017/0148118 | A1* | 5/2017 | Fuller | G06Q 50/18 |

OTHER PUBLICATIONS

Colley, W.N., "Colley's Bias Free College Football Ranking Method: The Colley Matrix Explained," Princeton University, Apr. 5, 2003, pp. 1-23.
PCT International Search Report and Written Opinion, PCT Application No. PCT/US2019/063435, dated Feb. 3, 2020, 17 pages.
United States Office Action, U.S. Appl. No. 16/696,915, dated Sep. 25, 2020, 17 pages.

* cited by examiner

SYSTEMS AND METHODS FOR IMPLEMENTING SEARCH AND RECOMMENDATION TOOLS FOR ATTORNEY SELECTION

CROSS REFERENCE TO RELATED APPLICATIONS

This application is a continuation of prior, co-pending U.S. application Ser. No. 16/696,915, filed on Nov. 26, 2019, which claims the benefit of U.S. Provisional Patent Application No. 62/773,133, filed Nov. 29, 2018, both of which are hereby incorporated by reference herein in their entirety.

TECHNICAL FIELD

The disclosure generally relates to the field of computer based search and recommendation systems and is particularly focused on providing search and recommendation tools for selecting attorneys.

BACKGROUND

Related art systems rely on crowdsourcing user feedback and ratings to provide a user searching for an attorney an idea of how the attorney might perform on the user's own claim. Such systems do not analyze an attorney's performance, neither absolutely nor relative to performance of other attorneys with a consideration of a variety of factors such as cost, claim type, and the like. Rather, these systems merely reflect how other users who hired these attorneys perceived the attorney's performance. Moreover, conventional search and recommendation systems cannot be applied to an attorney search and recommendation tool, as the processing of data that relate to attorney performance cannot be performed on the basis of related art ranking and scoring schemes. Further, related art systems do not evaluate attorney performance with respect to an evaluation of how an opponent attorney performed, and thus do not adjust for, e.g., attorney losses against first class attorneys, and attorney win records against historically ineffective attorneys.

BRIEF DESCRIPTION OF DRAWINGS

The disclosed embodiments have other advantages and features which will be more readily apparent from the detailed description and the accompanying figures (or drawings). A brief introduction of the figures is below.

FIG. 6 illustrates one embodiment of a user interface for searching for attorneys, in accordance with some embodiments of the disclosure.

FIG. 7 illustrates one embodiment of a user interface including a search results page of attorneys, listed with their associated attorney scores, in accordance with some embodiments of the disclosure.

DETAILED DESCRIPTION

Figure 1:
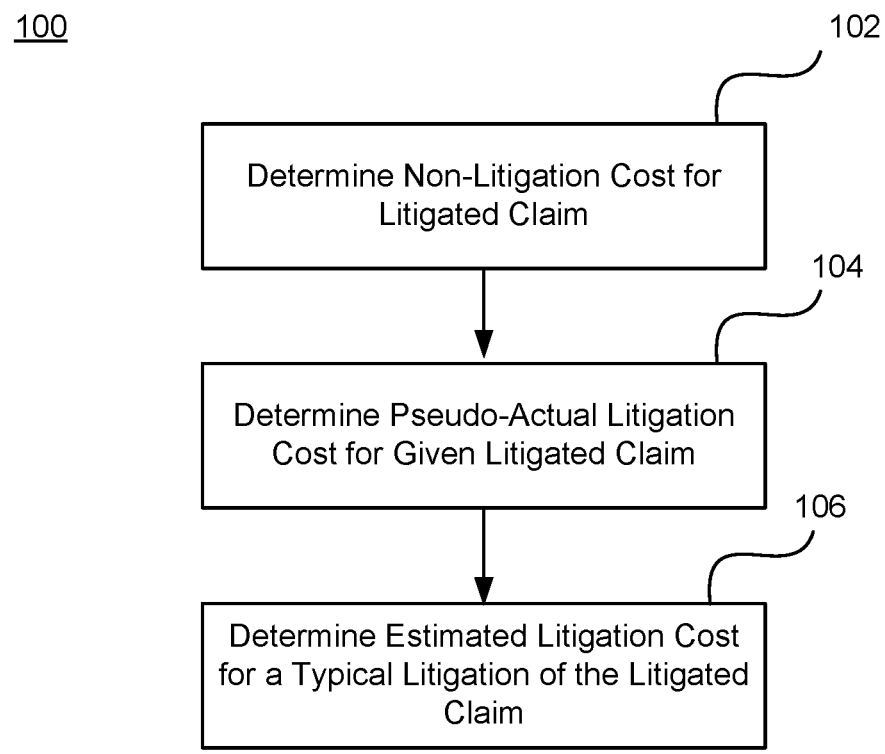
FIG. 1 illustrates one embodiment of a flowchart for determining a pseudo-actual litigation cost for a claim, which is used in computing a claim score for a defense attorney.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium for implementing search and recommendation schemes for attorneys is based on parameters and special processing that are specific to attorneys. For example, the performance of an insurance defense attorney cannot effectively be evaluated in a vacuum, or based solely on wins and losses. Rather, the systems and methods disclosed herein ingest attorney-specific information from attorney-specific sources, such as injury type and causes of injury, court docket information, opposing attorney score, and the like in order to determine a score for the insurance attorney. Having processed this information, the systems and methods disclosed herein provide both search mechanisms and recommendation mechanisms for selecting attorneys, or for replacing already-empaneled attorneys. The systems and methods disclosed herein form an improvement to conventional computer systems by, for example, referencing opponent attorney information, using attorney-specific categories and sub-categories, retrieving information from attorney specific sources, and the like.

As a brief overview, systems and methods are disclosed herein for enabling an entity to ensure that a best attorney is selected for a task, a worst attorney is avoided for a task, or both (e.g., a poor attorney is recommended to be removed from a task and replaced by an optimal or more highly rated attorney). The disclosed systems and methods are applicable to entities with access to adequate data describing the performance of attorneys and the attorneys they opposed (e.g. during litigation). An exemplary use case is an insurance company, such as a workers' compensation company, who employs a panel of attorneys for defending workers compensation claims. While the specification focuses on the workers' compensation example, any litigation scenario is applicable. As used in this exemplary case, the term "defense attorney" refers to an attorney who represents an insurance company in a claim made by an applicant (i.e. the worker). The insurance company has a vested interest in selecting a defense attorney to be in the panel who is most likely to obtain a best claim outcome—that is, an outcome for a claim that results in the lowest cost incurred to the insurance company. The term "claim," as used herein, is a legal assertion made by an applicant for workers' compensation benefits to receive those workers' compensation benefits (e.g., from an employer who has contracted with the insurance company).

In brief, a processor computes a claim score for a defense attorney by looking at the outcome of a claim handled by the defense attorney (e.g., assess the expense incurred by the insurance company), and comparing that to an estimate of what the claim would have cost the insurance company if handled by a typical attorney. A claim score will be higher if the defense attorney costs the insurance company less than the estimated claim cost (i.e. has better performance), and a claim score will be lower if the defense attorney costs the insurance company more than the estimated claim cost (i.e. has worse performance). The term "estimated claim cost," as used herein, refers to an estimate of what the claim would have cost the insurance company if handled by a typical attorney. The manner in which the estimated claim cost is calculated is discussed in further detail with respect to FIG. 1 below. The processor may also adjust the claim score based on various factors. For example, the processor may determine that while the defense attorney cost the insurance company more than an estimated claim cost, the defense attorney was up against a workers' compensation applicant's attorney who has a very high ranking and who is tough to prevail over, and may thus rate the defense attorney higher than if the defense attorney lost to an average applicant attorney. To account for such scenarios, the processor may normalize a claim score for a defense attorney based on any number of parameters, such as the ranking of an opposing attorney for the claim, a difficulty rating of the relevant case, a rating assigned to the judge in the case, etc. As used in this exemplary case, the term "applicant attorney" refers to an attorney who represents an applicant (i.e. the claimant) and opposes the given defense attorney in a worker's compensation claim. The manner in which the relative ratings work, and other factors that may cause a score to be further adjusted, are discussed in further detail below. The processor may also aggregate the claim scores of multiple claims handled by the defense attorney in order to compute an overall attorney score for the defense attorney Determining Claim Cost and Litigation Cost FIG. 1 illustrates one embodiment of a flowchart for determining a pseudo-actual litigation cost for a claim previously litigated by a defense attorney, which is used in computing a score for the defense attorney on the claim (i.e. a defense attorney claim score). When process 100 begins, a processor determines 102 a non-litigation cost for a claim previously litigated by the defense attorney. To make this determination, in an embodiment where the claim is a workers' compensation claim, the processor may ingest raw data, such as demographic information of the claimant (e.g., age, gender, occupation, etc.), the injury suffered by the workers compensation applicant and the cause of the injury, and the transaction history and purpose of the workers compensation claim thus far. The raw data may also include a diagnosis of the applicant, treatments, and prescriptions, and medical provider information for a provider who has taken on the applicant as a patient. Raw data for the claim may be obtained by the processor from attorney docket reports, internal law firm databases, internal insurance company databases, claimant demographic information databases (e.g., to determine claimant income), and any other sources of claim related data. In some embodiments, the processor anonymizes the raw data. Anonymization may include removing any information in the raw data which would allow identification of confidential insurance or legal information (e.g. an applicant's name). In other embodiments, the raw data is not anonymized when ingested and the raw data is processed separately depending on the origin of the raw data to prevent exposure of confidential information. In the same or different embodiments, the processor may ingest raw data which has already been anonymized by a third party system.

After ingesting the raw data, the processor calculates the cost of a claim if it were not to be litigated, also referred to as a "non-litigation cost" herein. To compute this cost, the processor may feature engineer the raw data. Feature engineering includes modifying the data, interpolating the data, and inferring information from the data to extract one or more features that describe characteristics of the data, based on instructions being processed by the processor. The extracted features may describe characteristics of the data which the defense attorney is not involved in and has no control over (i.e. non-attorney involvement features). For example, the age of a claimant may be used to determine a non-attorney involvement feature, the processor inferring that an injury is more severe if experienced by a person who is 70 years old, instead of 20 years old. Other costs that the defense attorney is not involved in include increased medical costs induced by an agent of the worker (e.g., a doctor who instructs the applicant to have more medical exams than are really needed) and when a worker has gone back to work (e.g., earlier or later than a typical applicant, and reducing or increasing the disability rating of a worker, respectively). The extracted features may also describe characteristics of the data reflecting on involvement of the defense attorney (i.e. attorney involvement features), like past performance information and information about the law firm that the defense attorney works for. The processor may input the extracted features into a non-litigation cost machine learning model which determines a non-litigation cost of the claim based on the features. In one embodiment, the non-litigation cost model is trained using non-attorney involvement features. In the same or different embodiment, the non-litigation cost model is trained using attorney involvement features.

The processor then goes on to determine 104 a pseudo-actual litigation cost for the claim. A pseudo-actual litigation cost, as used herein, is an approximate cost of a litigation of the claim. In an embodiment, the pseudo-actual litigation cost is determined by subtracting the non-litigation cost from a total claim cost included with the raw data corresponding to the claim. The processor additionally determines 106 an estimated litigation cost for a typical litigation of the claim (e.g. an average attorney's cost on the same claim) using a litigation cost machine learning model that is trained on non-attorney involvement and attorney involvement features. Specifically, the processor determines the estimated litigation cost by feeding the non-litigation cost and the pseudo-actual litigation cost to the litigation cost model, which outputs an estimated litigation cost for the claim. The processor uses the values determined in 104 and 106 to compute a claim score, based on a comparison of the pseudo-actual litigation cost for the defense attorney to the estimated litigation cost of a typical attorney. In some embodiments, the litigation cost model also considers features describing a claim score for an opposing attorney on the same claim, as will be described in further detail below.

In various embodiments, the processor determines the claim score by determining an estimated total cost of the claim which provides an average cost for handling the claim. For example, claims with similar characteristics as the current claim may generally not be litigated. In this case, even though the actual total cost of the claim includes litigation costs (given that it was litigated by the defense attorney), on average the same claim would not be litigated and the total cost would not include litigation costs. As such, the estimated total cost provides a reference regarding whether the actual total cost is high or low. The processor may determine the estimated total cost using a total cost machine learning model by feeding features extracted from the raw data described above into the total cost model. In the same or different embodiment, the claim score may then be determined by normalizing the difference between the pseudo-actual litigation cost and the estimated litigation cost with reference to the estimated total cost. In various embodiments, the processor trains the total cost model using historical raw data describing both claims that were litigated and claims that were not litigated.

Determining Defense Attorney and Applicant Attorney Claim Scores

Figure 2:
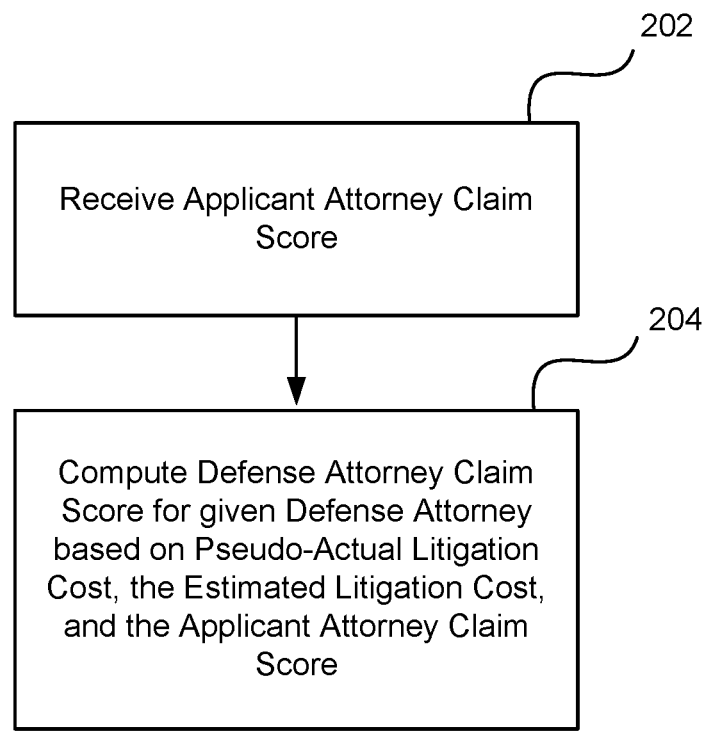
FIG. 2 illustrates one embodiment of a flow chart for computing a claim score for a defense attorney.

FIG. 2 illustrates one embodiment of a flow chart for computing a claim score for a defense attorney on one or more claims litigated by the defense attorney (i.e. a defense attorney claim score). Process 200 begins with the processor receiving 202 a claim score for an applicant attorney who opposed the defense attorney (i.e. an applicant attorney claim score) from a claim score module for each of the one or more claims litigated by the defense attorney. The manner in which the applicant attorney claim score is calculated will be discussed with respect to FIG. 3 below. The processor then computes a claim score for each of the one or more claims based on the pseudo-actual litigation costs for the claim at issue (described above with respect to element 104 of FIG. 1), as well as based on an estimated litigation cost for a typical litigation of the claim (as discussed above with respect to element 106 of FIG. 1), and based on the received applicant attorney claim score.

To compute the claim score for each claim of the one or more claims, the processor subtracts the non-litigation cost for the claim (as discussed with reference to element 102 of FIG. 1) from the total claim cost of the claim to determine a pseudo-actual litigation cost for the claim (as discussed with reference to element 104 of FIG. 1). The processor then determines an estimated litigation cost for a typical litigation of the claim (as computed with reference to element 106 of FIG. 1). The processor uses the pseudo-actual litigation cost the estimated litigation cost, and the applicant attorney score to determine an initial claim score for the particular claim. Each claim score computed for each of the one or more claims is used as an initial defense attorney claim score on the relevant claim. In some embodiments, the processor determines the initial defense attorney claim score on a given claim without reference to the applicant attorney claim score, such as by using the litigation cost model described above. In this case, the processor may determine the initial defense attorney claim score without the applicant attorney claim score for each claim before beginning the iteration cycle described below with reference to FIGS. 4A and 4B.

Figure 4A:
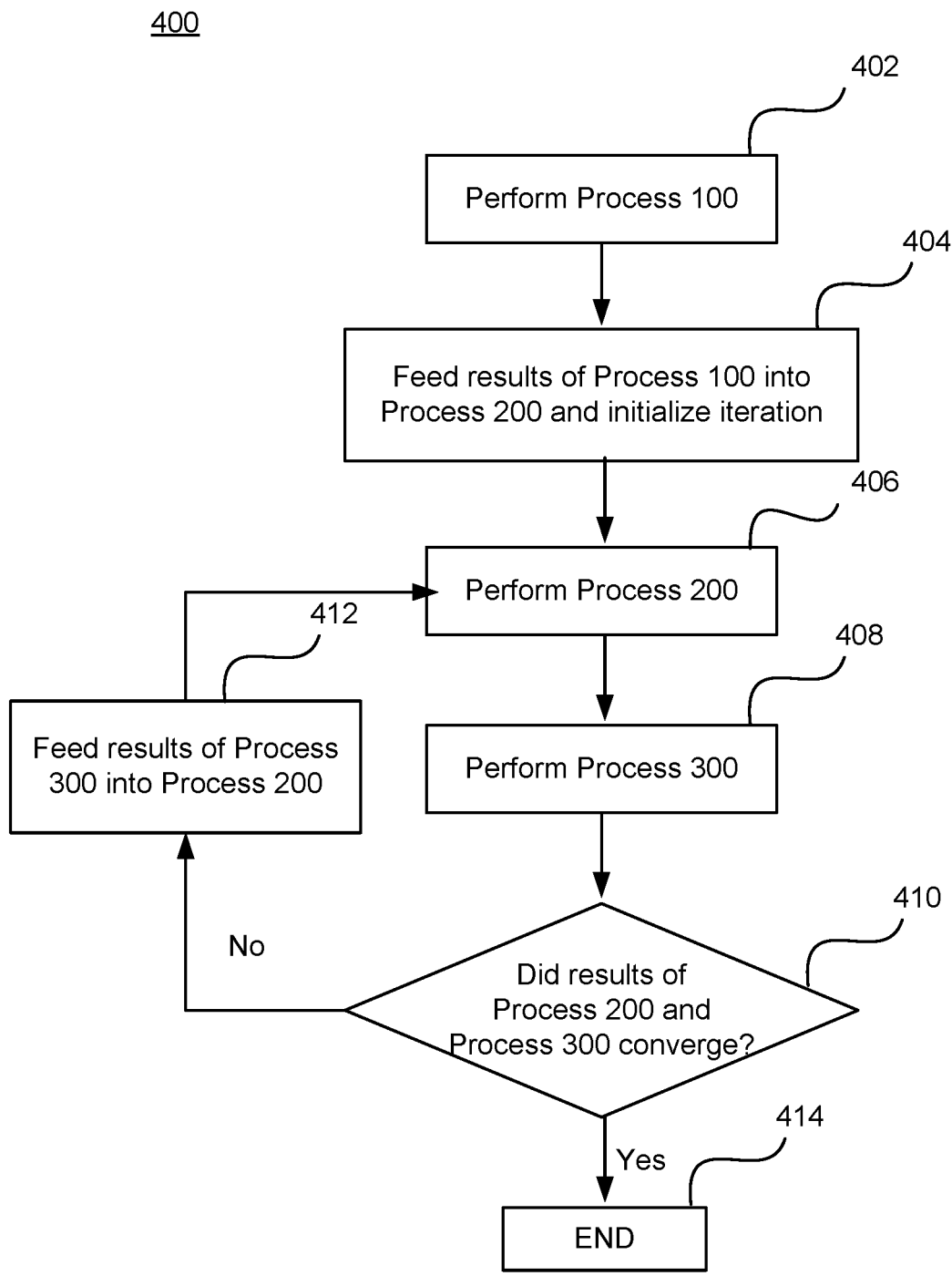
FIG. 4A illustrates one embodiment of a flow chart for iterating the applicant attorney score and defense attorney score calculations until the scores converge.
Figure 4B:
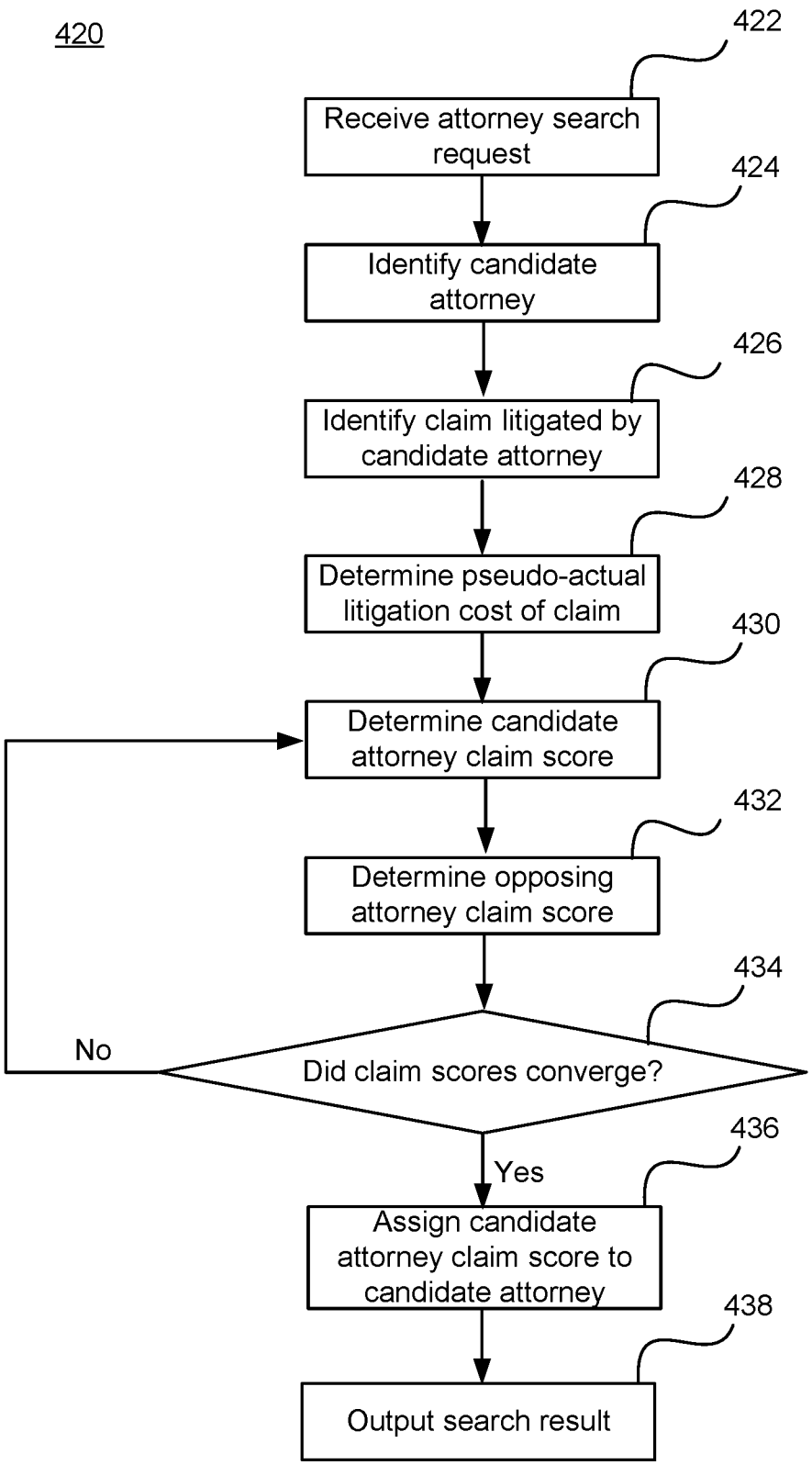
FIG. 4B illustrates one embodiment of a flow chart for determining claim scores for opposing attorneys in response to receiving an attorney search request.

To begin the iteration cycle shown in FIGS. 4A and 4B (described further below), the processor randomly assigns a claim score of an applicant attorney to each applicant attorney for each of one or more claims litigated by the defense attorney and feeds the claim scores to the attorney score module. The processor then determines an estimated litigation cost for each of the one or more claims based on the applicant attorney claim score, the non-litigation cost of the claim, and the pseudo-actual cost for the claim. In one embodiment, the processor uses a machine learning model similar to the litigation cost model described above, but which considers additional features describing the applicant attorney claim score (i.e. a defense attorney litigation cost model). For example, the additional features describing the applicant attorney claim score may include an overall applicant attorney score derived from the applicant attorney claim score, as described below. In this case, the processor determines a defense attorney claim score for each of the one or more claims using the litigation cost output by the defense attorney litigation cost model. In one embodiment, the processes shown in FIGS. 4A and 4B are performed by the attorney score module 560, which is described below in relation to FIG. 5.

Figure 3:
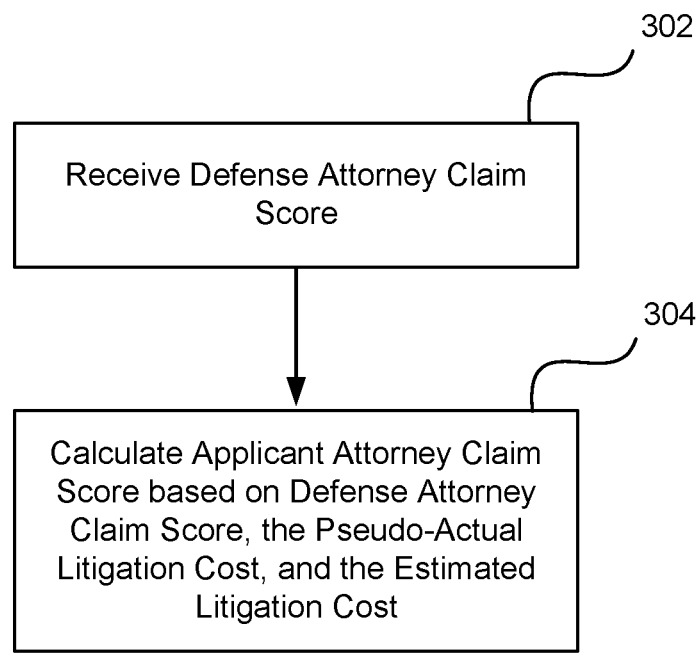
FIG. 3 illustrates one embodiment of a flow chart for calculating a claim score for an applicant attorney.

As depicted in FIG. 3 (discussed further below), the processor uses the defense attorney claim score for each of the one or more claims generated above in a parallel process for determining a new applicant attorney claim score for each claim. In some embodiments, the attorney score module includes an additional machine learning model similar to the defense attorney litigation cost model which takes as input features describing the defense attorney claim score (i.e. an applicant attorney litigation cost model), and features describing the claim, and outputs an applicant attorney claim score. For example, the input feature describing the defense attorney claim score may be an overall defense attorney score derived from the defense attorney claim score, as described in the following paragraph. The processor uses the applicant attorney litigation cost model to determine an applicant attorney litigation cost and use this value to determine the new applicant attorney claim score. The processor may then repeat this process and compute a new defense attorney claim score and applicant attorney claim score for each claim using the current claim scores over one or more iterations, as indicated in FIG. 4. These iterations continue until the defense attorney and applicant attorney claim scores converge, as explained below with reference to FIGS. 4A and 4B.

In various embodiments, the attorney score module determines the overall defense attorney score by aggregating the defense attorney claim scores for each of the one or more claims litigated by the defense attorney. The overall defense attorney score may be determined responsive to each of the defense attorney claim scores being updated in the iteration cycle described above. Claim score aggregation may be performed through one or more statistical operations, such as the simple mean, Bayesian mean, median, or a standard score (i.e. z-score) of the defense attorney claim scores. The overall applicant attorney scores are determined in a similar manner, where each of the applicant attorneys' claim scores are aggregated to determine an overall application attorney score for each applicant attorney. In some embodiments, the overall applicant attorney scores are determined based on claims which the defense attorney was not involved in (i.e. cases handled by the applicant attorney with other defense attorneys). In other embodiments, only the claims for which the given defense attorney was involved are considered.

FIG. 3 illustrates one embodiment of a flow chart for calculating a claim score for an applicant attorney on a claim litigated by the defense attorney. Process 300 begins with the processor receiving 302 a claim score for a claim litigated by the given defense attorney from the claim score module. Details on how the claim score was calculated are described in further detail above with respect to FIG. 2. Process 300 continues to 304, where the processor calculates the applicant attorney claim score for each claim based on the given defense attorney's claim score on the same claim, the non-litigation cost of the claim (as calculated in the same manner referenced above with respect to FIG. 1) and the pseudo-actual litigation cost of the same claim (as calculated in the same manner referenced above with respect to FIG. 1).

In some embodiments, the defense attorney claim scores and the applicant attorney claim scores calculated by the processor using the flows of FIGS. 2-3 are not static, and are recalculated through an iterative process until the processor determines that the calculated scores are in fact accurate. Additionally, the overall defense attorney score and overall applicant attorney scores may be recalculated responsive to each of the respective claim scores being recalculated. FIG. 4A illustrates one embodiment of a flow chart for iterating the applicant attorney score and defense attorney score calculations until the scores converge. Process 400 begins with the processor performing 402 process 100, as described with respect to FIG. 1 above. At 404, the processor feeds 404 the results of process 100 into process 200 in the manner described above, and initializes an iteration of processes 200 and 300. The processor then performs 406 process 200 and performs 408 process 300. The processor determines 410 whether the results of process 200 and process 300 converged. The conditions for convergence are described in greater detail below with reference to process 400.

In connection with process 400, when the processor determines claim scores for defense or applicant attorneys, the processor continues to iterate as specified in FIG. 4 and update the claim score with each iteration. With each iteration, the processor compares the new claim score to the claim score received in the last iteration for both defense and applicant attorneys. In some embodiments, the processor determines the results of process 200 and process 300 have converged when each of the defense attorney's claim scores and each of the applicant attorney's claim scores do not change relative to the immediately prior cycle of the iteration. In other embodiments, the processor determines the results of process 200 and process 300 have converged when the overall defense attorney's score and the overall applicant attorney's score do not change relative to the immediately prior cycle of the iteration.

In an embodiment, each attorney is assigned a "tier" or a grade that the processor determines based on the attorney's claim scores. In one embodiment, the tier is assigned based on the overall attorney score derived from the attorney's claim score on each claim litigated by the attorney, as described above. As an example, the processor may assign an attorney a tier or grade based on one of 5 tiers (A-E), with each tier having a set threshold for what overall attorney score is considered an A versus B, versus C, D and E for each attorney (A being the best, and E being the worst, and C meaning the attorney is performing as expected). The threshold may be a default value or may be assigned by an operator and stored to memory, from where the processor retrieves the threshold for determining the tiers.

In one embodiment, the processor determines the results of process 200 and process 300 to have converged based on the defense attorney and applicant attorney tiers. In particular, when the processor determines that the new overall attorney score in the iteration and the previous overall attorney score do not cause a change in tiers, then the processor considers the scores to be "converged." This means that an A attorney stays an A, B stays a B, etc., which ensures that the overall attorney score is accurate as to the respective attorney's performance, that is the attorney's final overall score and tier, and that the processor is to no longer iterate through the applicable elements of FIG. 4A.

If the processor determines that the results did converge, the processor ends 414 process 400, and selects the results of process 200 and process 300 as the correct defense attorney claim scores and applicant attorney scores, respectively. Otherwise, the processor feeds 412 the results of process 300 into process 200, and iterates again from 406 onward.

The systems and methods disclosed above generally rank defense attorneys based on overall performance and applicant attorney performance. While the terms "defense attorney" and "applicant attorney" are used ubiquitously herein, this is merely for convenience; any opposing attorneys can be scored using the systems and methods disclosed herein. FIG. 4B illustrates one embodiment of a flow chart for determining claim scores for opposing attorneys in response to receiving an attorney search request. Process 420 begins with the processor receiving 422 a search request for attorneys which includes one or more requirements. Based on the search request requirements, the processor identifies 424 one or more candidate attorneys.

For each of the one or more candidate attorneys, the processor identifies 426 a claim litigated by the candidate attorney and determines 428 a pseudo-actual litigation cost for the identified claim using associated raw claim data. The processor uses the pseudo-actual litigation cost to determine 430 an initial candidate attorney claim score for the identified claim. Based on the candidate attorney claim score, the processor determines 432 an opposing attorney claim score. In one embodiment, the processor uses a defense attorney litigation cost model (as described above) and an overall opposing attorney score derived from the opposing attorney claim score to determine an estimated litigation cost for the candidate attorney. In the same or different embodiment, the processor uses an applicant attorney litigation cost model and an overall candidate attorney core derived from the candidate attorney claim score to determine an estimated litigation cost for the opposing attorney, as described above.

Next, the processor determines 434 whether the candidate attorney claim score and the opposing attorney claim score converged, as described above in relation to FIG. 4A. If the claim scores did not converge, the processor recalculates the candidate attorney claim score and the defense attorney claim score and checks for convergence again. If the claim scores did converge, the processor assigns 436 the candidate attorney claim score to the candidate attorney for that particular claim. In one embodiment, the processor recalculates the candidate attorney claim score and the defense attorney claim score at least one time before determining whether convergence has occurred.

After performing the above process for one or more claims litigated by the one or more candidate attorneys, the processor outputs 438 a result based on the claim scores assigned to the one or more candidate attorneys. In various embodiments, the processor aggregates the candidate attorney claim scores for each claim litigated by the candidate attorney to determine an overall candidate attorney claim score which is assigned to the candidate attorney and the output result is based on. In the same or different embodiments, the opponent attorney is also assigned an overall score which the output may be based on.

The general embodiment described above does not consider that some attorneys are better at some types of claims, but bad at others; however, further embodiments described below address this issue. For example, the processor may receive input from a user (e.g., by way of a user input, as will be discussed below) specifying that a search is to be performed based on performance of attorneys on a specified type (or types) of claim. Alternatively, the processor may detect that a user accessing a dashboard with a panel of empaneled attorneys is concerned with a particular type of claim, and may recommend replacing a defense attorney based on attorney scores that only consider the attorney's performance with respect to that particular type of claim. The term "sub-score," as used herein, describes cores that determine an attorney's performance with a particular type of claim or aspect of a claim.

Some examples of attorney sub-scores follow. Permanent disability is a sub-score that indicates the attorney's ability to work with the physician and claimant to fight for a fair PD rating and permanent disability compensation. Temporary disability is a sub-score that indicates an attorney's ability to work with a claimant to regain their ability to work (given that a temporarily disabled claimant will likely be away from work and receive ongoing medical care, which increases cost). Expenses refers to a sub-score that is a part of the claim cost that did not pay as compensation, e.g. attorney fee, bill review fee, etc. The expense score indicates the attorney's ability to close the claim with lower expense. A settlement is a sub-score that indicates the ability to settle the claim in a timely manner and at a fair cost. For example, the settlement sub-score indicates factors in whether settlement occurs before, during, or after trial. Injury is a sub-score that indicates the attorney's ability to work with a claimant with a particular type of injury. Industry is a sub-score that indicates the attorney's ability to work with a claimant whose claim relates to a particular industry.

In some embodiments, additional feature engineering can be performed with respect to features that involve attorney action in computing a claim score for an attorney. For example, the processor may retrieve a court docket for a given claim and may parse the docket to determine aspects of the docket, such as how many motions were filed, when motions were filed, how much discovery was performed and on what timeline, and the like. The processor then compares the docket report to a template docket report to determine whether the attorney was efficient or inefficient (e.g., by determining whether motions were filed ahead of known deadlines, by determining whether aspects of discovery were late-performed or missed, etc.). For example, the processor compares the docket report for the claim against a docket report indicating a timeline for when certain motions are to be filed with respect to the claim's complaint or answer having been filed. The processor is able to, from such a comparison, determine whether the attorney acted efficiently or inefficiently, and whether the attorney missed any deadlines. Additionally, a law firm score is a sub-score that indicates the law firm's ability to handle insurance claims based on the historical performance of the attorneys in the law firm, and may be factored in when the processor generates a claim score for an attorney from a given law firm.

In some embodiments, the processor may factor even further information when generating an attorney score. For example, the processor may use models that show insight of judges' preference and help the adjuster and attorney close the claim at fair cost. The processor may, using this information, additionally rate attorneys based on their performance in front of certain judges and also rate the judges' fairness on claims.

Further, because claim output often depends on the adjusters' decisions, such as the choice of attorney, how the adjusters communicate with claimants, etc., the processor may calculate an adjuster score indicates the adjusters' ability to make decisions for the interest of insurance company. The processor may factor the adjustor score for a claim into the attorney score.

The processor may also examine a claim timeline in a manner similar to the processor tracking events on a court docket, as discussed above. The processor may track events in the development of a claim, such as communication with the claimant, actions, medical care, etc. The processor may identify factors that hinder the claim from closing as soon as it occurs to determine how the attorney fits into the picture and how they impact the outcome of the claim. Yet further, given that some providers are more litigious than others, the processor may identify medical providers that are likely to lead the claim to litigation at an early stage. The processor may factor typical provider behavior in determining a claim score and a defense attorney's overall performance on the claim.

Figure 5:
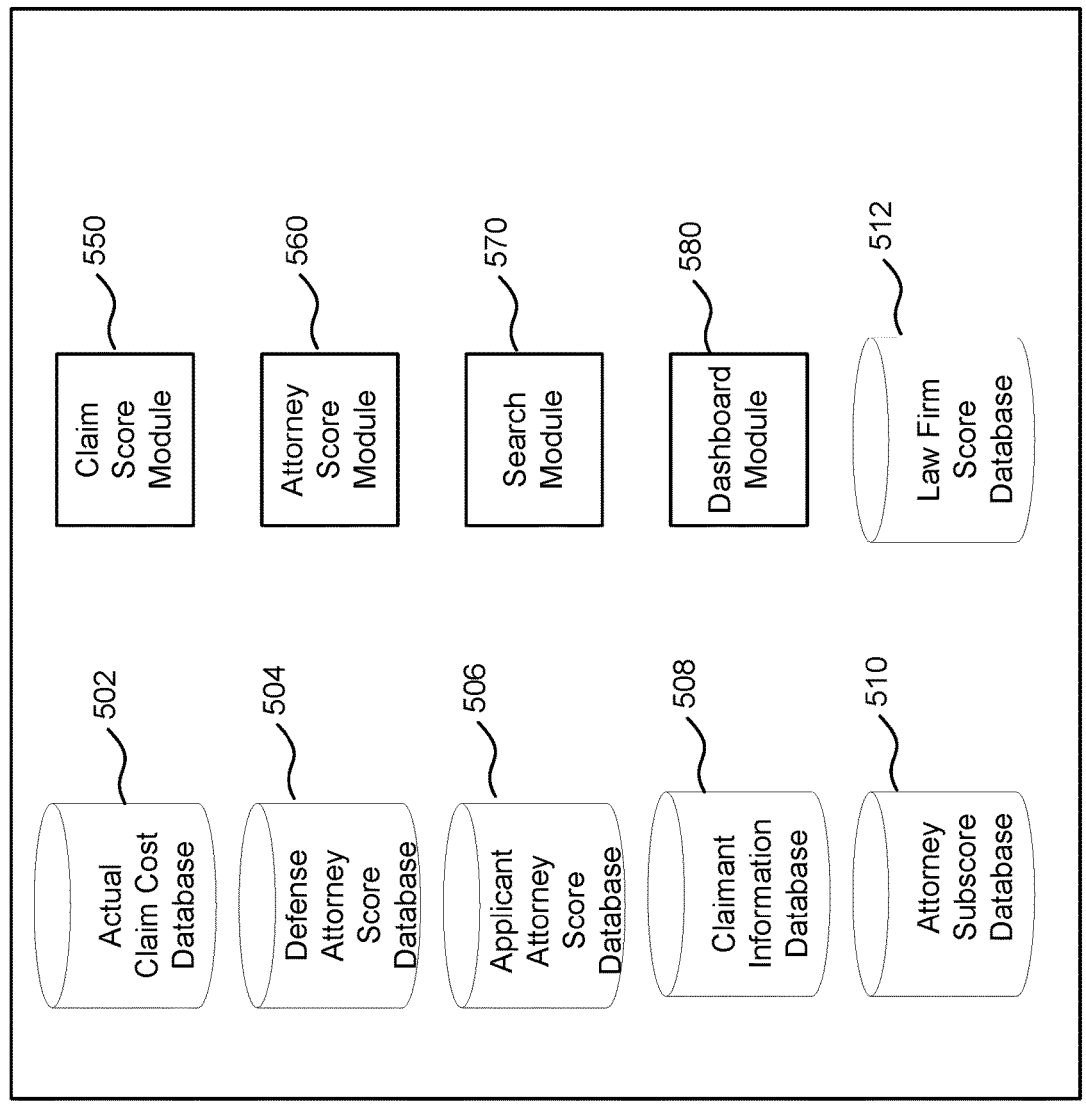
FIG. 5 illustrates one embodiment of a system that accesses various databases and executes various modules in connection with computing attorney scores, in accordance with some embodiments of the disclosure.

FIG. 5 illustrates one embodiment of a system that accesses various databases and executes various modules in connection with computing attorney scores, in accordance with some embodiments of the disclosure. FIG. 5 depicts system 500, which includes various databases and various modules. System 500 may be distributed, in that the databases and modules discussed in association therewith may be distributed over a plurality of servers and/or client devices, or may be housed together as illustrated. Moreover, one or more of the modules or databases of system 500 may be hosted by or accessed through a third party system.

Actual claim cost database 502 includes data described above that describes an actual total cost of a claim (i.e., the total amount spent to service a claim, including attorney fees, court fees, settlement or other payout awards to an applicant, and the like). Actual claim cost database 502 may include total claim cost for each claim, a breakdown of costs that went into the total claim cost calculation, and any other costs that inform the total claim cost. A claim score may be calculated by claim score module 550 using data from actual claim cost database 502 in the manners described above. Defense attorney score database 504 may include defense attorney scores for each defense attorney (e.g., as calculated by attorney score module 560 in a manner consistent with what is described above with reference to FIGS. 1-4). Applicant attorney score database 506 may include applicant attorney claim scores for each applicant attorney (e.g., as calculated by attorney score module 560 in a manner consistent with what is described above with reference to FIGS. 1-4).

Claimant information database 508, attorney sub-score database 510, and law firm score database 512 house additional raw data and sub-score information described above to further inform the scoring and ranking processes described herein. Search module 570 may be executed by the processor to perform an attorney search, in the manners described above and which will be further described below with reference to a search user interface. Dashboard module 508 may be executed by the processor to provide recommendations for attorneys (e.g., a replacement of a defense attorney on a panel) in manners described above, and in manners that will be described below with reference to a dashboard user interface).

Figure 6:
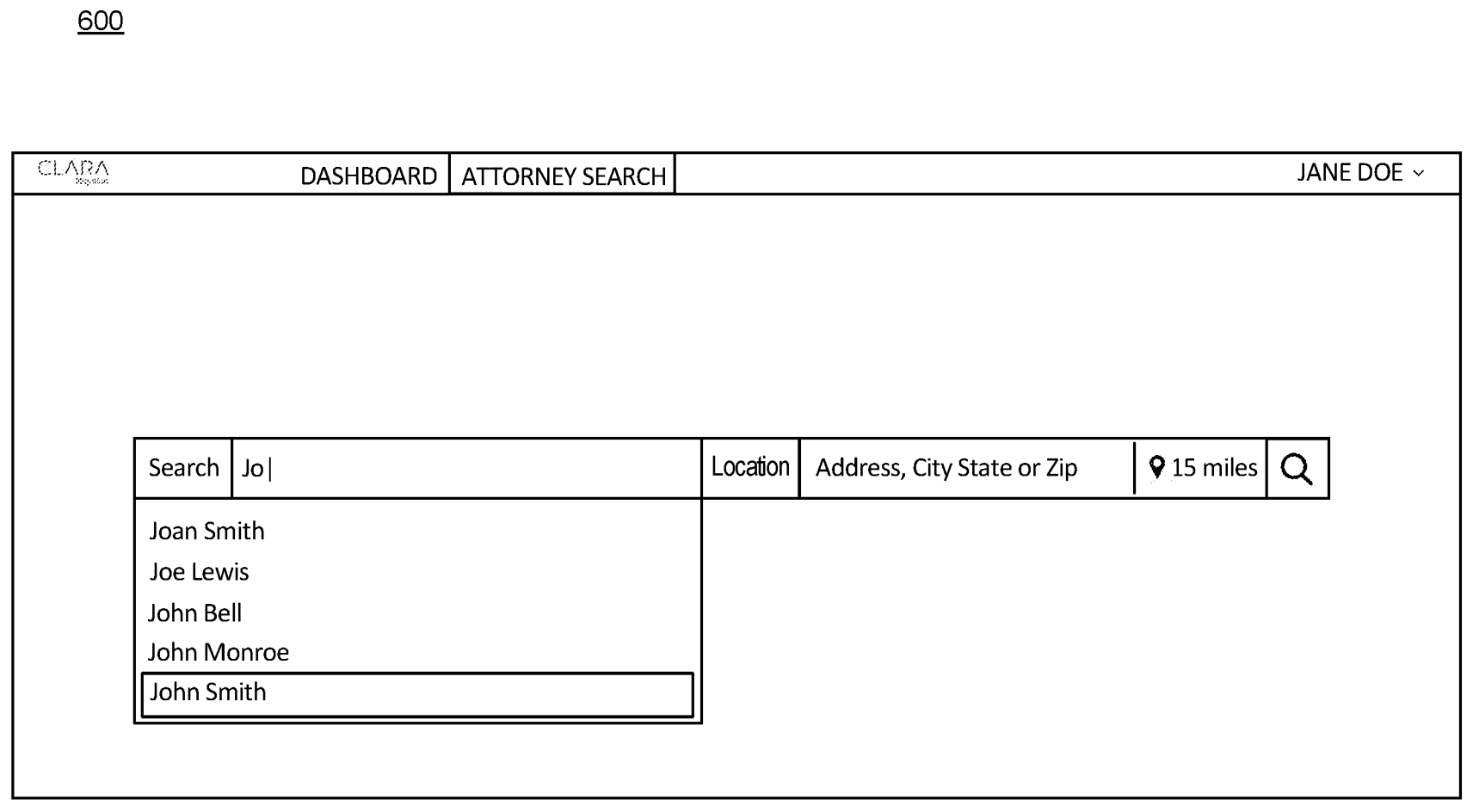

FIG. 6 illustrates one embodiment of a user interface for searching for attorneys, in accordance with some embodiments of the disclosure. User interface 600 includes a search bar and a location bar in connection with an attorney search, such as a defense attorney search. The processor may detect keywords input by a user into the search bar, and may detect a location input by a user into the location bar. The processor may provide results when only a partial search string is input, as depicted, and may update those results as further characters are detected by the processor as added to the search string. The processor may execute the processes described above in relation to FIGS. 1-4 based on a search submitted by the user. For example, the user may search for attorneys near their current location. In this case, the processor may identify a plurality of attorneys within some distance from the user's current location and determine claim scores or overall scores for each of the candidate attorneys. The processor may then cause the user interface to display each of the identified attorneys with one or more corresponding scores. The processor may also cause user interface 600 to include additional fields for user input. For example, the processor may generate for display within user interface 600 a selection field for a user to select types of sub-scores, claims, and the like to be factored into an attorney search and any scores computed for attorneys identified by the search. If the user does not enter information into these additional fields when submitting a search, the search and related scores may be computed without considering these additional factors.

Figure 7:
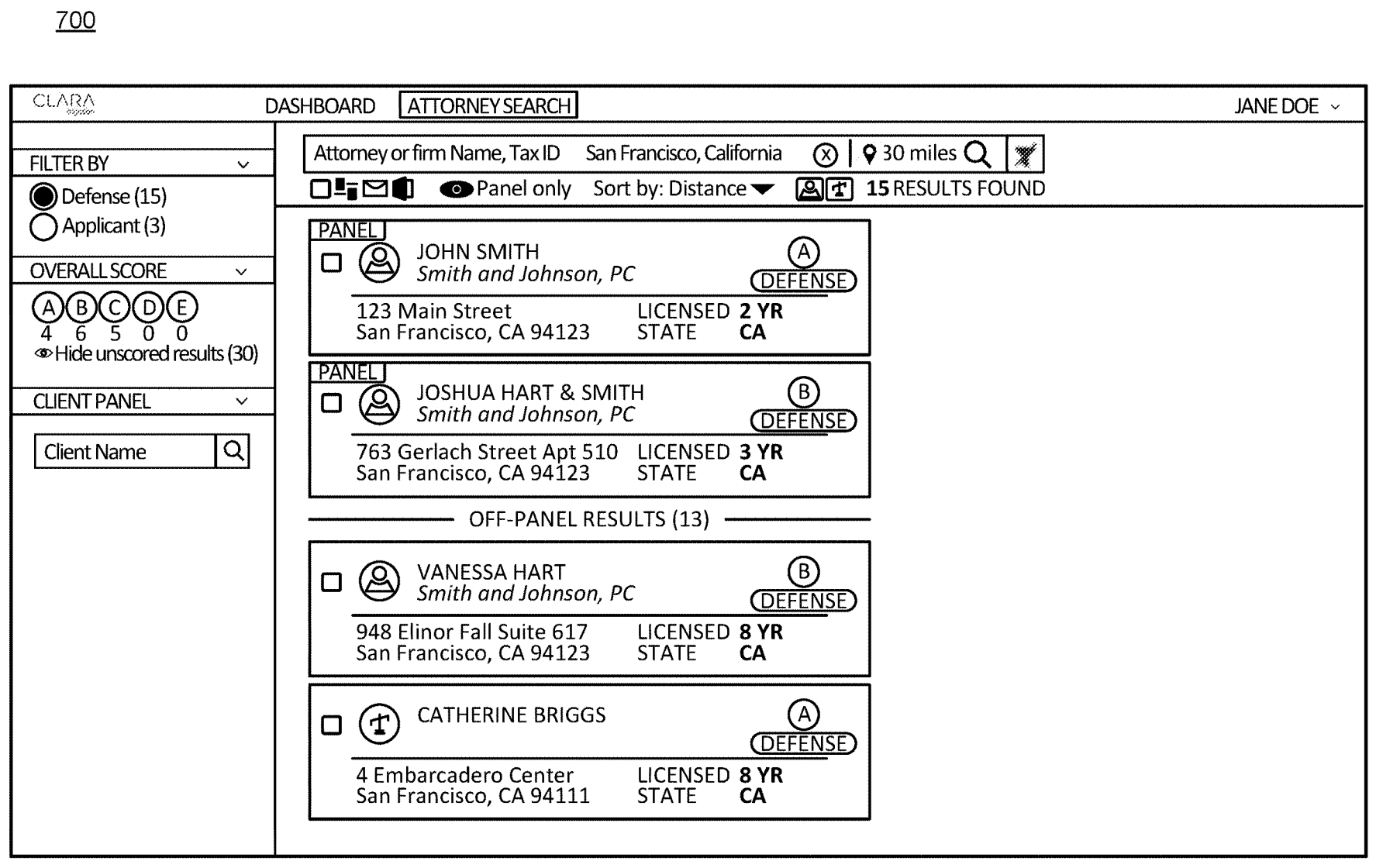

FIG. 7 illustrates one embodiment of a user interface including a search results page of attorneys, listed with their associated overall attorney scores, in accordance with some embodiments of the disclosure. The processor may generate for display search results 700 in response to processing user input made with respect to user interface 600. The search results 700 include a list of attorneys. The processor may cause search results 700 to be ranked based, at least in part, on an overall attorney score or attorney claim scores, as calculated in the manners discussed above. The processor may cause additional information to be displayed along with each attorney in the list, such as ranking, law firm information, and the like. The processor may also regenerate search results 700 for display in response to the user altering the input made with respect to user interface 600. In this case, the processor may update the search result 700 rankings based on changes to overall attorney scores or attorney claim scores resulting from the input alterations. In some embodiments, user interface 600 provides the user with options for initiating regeneration of search results 700. For example, user interface 600 may include options for constraining or changing search results 700 such as attorney cost filters, attorney score filters, changing the user's current location, or a refresh button.

Figure 8:
FIG. 8 illustrates one embodiment of a user interface including a dashboard with attorney replacement recommendations, in accordance with some embodiments of the disclosure.

FIG. 8 illustrates one embodiment of a user interface including a dashboard with attorney replacement recommendations, in accordance with some embodiments of the disclosure. Dashboard interface 800 includes information for a company that hires attorneys, such as an insurance company who hires a defense attorney, to review a panel of attorneys presently working on the company's claims. The processor may analyze attorney scores for each hired attorney in the manners described above, and may determine that one or more sub-optimal or less well-ranked attorneys are presently hired on an attorney panel to defend claims against the company. The processor may generate for display a recommendation to remove an attorney, to replace an attorney with a more optimal or better ranked attorney, or a combination thereof, based on attorney claim scores or an overall attorney score. The processor may additionally recommend a panel of attorneys with respect to types of claims, where different panels of attorneys are recommended for each different type of claim. The processor may recommend the panel by detecting attorney scores while factoring in sub-scores in the manners described above.

Computing Machine Architecture

Figure 9:
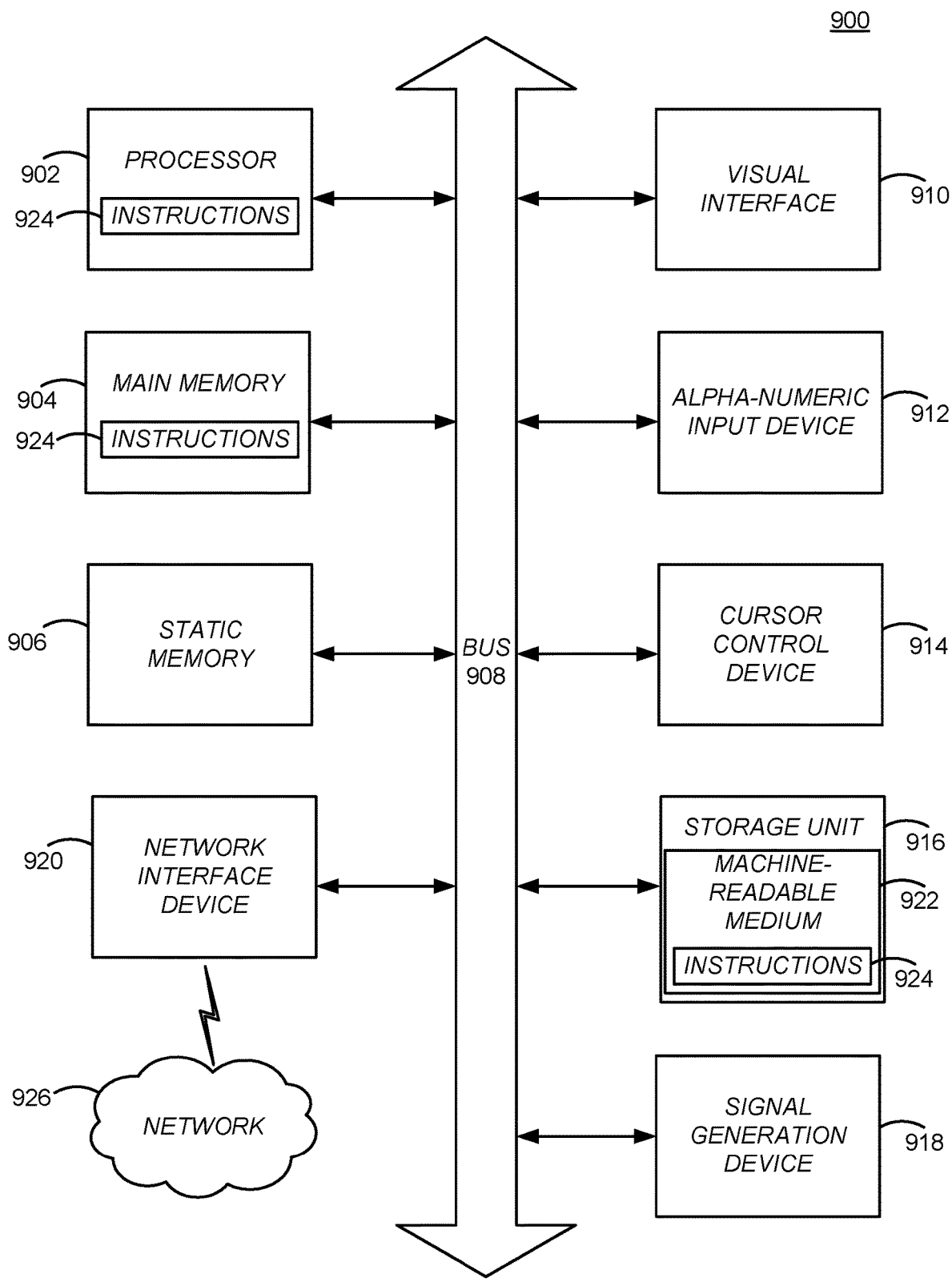
FIG. 9 illustrates one embodiment of a block diagram illustrating components of an example machine able to read instructions from a machine-readable medium and execute them in a processor (or controller), in accordance with some embodiments of the disclosure.

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 900 includes a processor 902 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 904, and a static memory 906, which are configured to communicate with each other via a bus 908. The computer system 900 may further include visual display interface 910. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 910 may include or may interface with a touch enabled screen. The computer system 900 may also include alphanumeric input device 912 (e.g., a keyboard or touch screen keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 (e.g., software) may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store instructions (e.g., instructions 924). The term "machine-readable medium" shall also be taken to include any medium that is capable of storing instructions (e.g., instructions 924) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for attorney scoring through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein.

What is claimed is:

1. A method comprising:
    receiving, from a client device, a request to search for attorneys from a plurality of attorneys associated with stored information describing claims previously litigated by the plurality of attorneys;
    identifying one or more candidate attorneys from the plurality of attorneys based on the search request;
    for each candidate attorney from the one or more candidate attorneys:
        extracting features for a claim litigated by the candidate attorney from the stored information,
        determining an estimated litigation cost for the claim by applying the extracted features to a machine learned model,
        estimating an opposing attorney claim score for an opposing attorney who opposed the candidate attorney when litigating the claim, and
        determining, using the estimated litigation cost and the opposing attorney claim score, a candidate attorney claim score for the candidate attorney indicating a performance of the attorney in litigating the claim relative to the opposing attorney;
    generating a search result including the one or more candidate attorneys ordered by the claim score for each of the one or more candidate attorneys, the search result interface including an indication of how the claim score for each candidate attorney would impact a cost of a future litigation if litigated by the candidate attorney; and
    providing the search result interface for display on the client device in response to the request.

2. The method of claim 1, wherein the estimated litigation cost is a pseudo-actual litigation cost approximating an actual litigation cost for the claim, and determining the candidate attorney claim score comprises:
    determining a typical litigation cost for the claim based on the extracted features and the opposing attorney claim score; and computing the candidate attorney claim score based on a difference between the pseudo-actual litigation cost and the typical litigation cost.

3. The method of claim 2, wherein the typical litigation cost is determined by an additional machine learned model using the extracted features and the opposing attorney claim score.

4. The method of claim 3, wherein determining the candidate attorney claim score for the candidate attorney comprises:
determining an overall score for the opposing attorney based on the opposing attorney claim score;
inputting the overall score and the extracted features into the additional machine learned model; and
receiving the typical litigation cost as output from the additional machine learned model.

5. The method of claim 1, wherein determining the estimated litigation cost for the claim comprises:
determining a non-litigation cost for the claim using the machine learned model;
identifying a total actual cost of the claim; and
subtracting the non-litigation cost from the total actual cost.

6. The method of claim 1, further comprising:
while the candidate attorney claim score and the opposing attorney claim score have not converged, redetermining the opposing attorney claim score and the candidate attorney claim score; and
responsive to determining that the candidate attorney claim score and the opposing attorney claim score have converged, assigning the candidate attorney claim score to the candidate attorney for generating the search result.

7. The method of claim 6, further comprising determining that the candidate attorney claim score and the opposing attorney claim score have converged by:
determining whether a tier assigned to the candidate attorney matches a tier assigned to the opposing attorney; and
responsive to determining that the tier assigned to the candidate attorney matches the tier assigned to the opposing attorney, determining that the candidate attorney claim score and the opposing attorney claim score have converged.

8. The method of claim 1, wherein a claim score is determined for each claim in the plurality of claims litigated by the candidate attorney and the claim scores are aggregated to determine an overall score for the candidate attorney.

9. The method of claim 8, wherein the search request includes a request claim type and the plurality of claims litigated by the candidate attorney are filtered for claims with a type matching the request claim type.

10. The method of claim 1, wherein outputting the search result further comprises:
assigning each of the one or more candidate attorneys to a tier in a plurality of tiers based on the candidate attorney claim scores of the one or more candidate attorneys; and
determining a first ordering of the one or more candidate attorneys based on the assigned tiers.

11. A system comprising one or more processors configured to execute instructions that cause the one or more processors to:
receive, from a client device, a request to search for attorneys from a plurality of attorneys associated with stored information describing claims previously litigated by the plurality of attorneys;
identify one or more candidate attorneys from the plurality of attorneys based on the search request;
for each candidate attorney from the one or more candidate attorneys:
extract features for a claim litigated by the candidate attorney from the stored information,
determine an estimated litigation cost for the claim by applying the extracted features to a machine learned model,
estimate an opposing attorney claim score for an opposing attorney who opposed the candidate attorney when litigating the claim, and
determine, using the estimated litigation cost and the opposing attorney claim score, a candidate attorney claim score for the candidate attorney indicating a performance of the attorney in litigating the claim relative to the opposing attorney;
generate a search result including the one or more candidate attorneys ordered by the claim score for each of the one or more candidate attorneys, the search result interface including an indication of how the claim score for each candidate attorney would impact a cost of a future litigation if litigated by the candidate attorney; and
provide the search result interface for display on the client device in response to the request.

12. The system of claim 11, wherein the estimated litigation cost is a pseudo-actual litigation cost approximating an actual litigation cost for the claim, and determining the candidate attorney claim score further comprises instructions that cause the one or more processors to:
determining a typical litigation cost for the claim based on the extracted features and the opposing attorney claim score; and
computing the candidate attorney claim score based on a difference between the pseudo-actual litigation cost and the typical litigation cost.

13. The system of claim 12, wherein the typical litigation cost is determined by an additional machine learned model using the extracted features and the opposing attorney claim score.

14. The system of claim 11, wherein determining the estimated litigation cost for the claim further comprises instructions that cause the one or more processors to:
determining a non-litigation cost for the claim using the machine learned model;
identifying a total actual cost of the claim; and
subtracting the non-litigation cost from the total actual cost.

15. The system of claim 11, wherein the one or more processors are further configured to execute instructions that cause the one or more processors to:
while the candidate attorney claim score and the opposing attorney claim score have not converged, redetermining the opposing attorney claim score and the candidate attorney claim score; and
responsive to determining that the candidate attorney claim score and the opposing attorney claim score have converged, assigning the candidate attorney claim score to the candidate attorney for generating the search result.

16. A non-transitory computer readable medium configured to store instructions, the instructions when executed by a processor cause the processor to:

receive, from a client device, a request to search for attorneys from a plurality of attorneys associated with stored information describing claims previously litigated by the plurality of attorneys;

identify one or more candidate attorneys from the plurality of attorneys based on the search request;

for each candidate attorney from the one or more candidate attorneys:
  extract features for a claim litigated by the candidate attorney from the stored information,
  determine an estimated litigation cost for the claim by applying the extracted features to a machine learned model,
  estimate an opposing attorney claim score for an opposing attorney who opposed the candidate attorney when litigating the claim, and
  determine, using the estimated litigation cost and the opposing attorney claim score, a candidate attorney claim score for the candidate attorney indicating a performance of the attorney in litigating the claim relative to the opposing attorney;

generate a search result including the one or more candidate attorneys ordered by the claim score for each of the one or more candidate attorneys, the search result interface including an indication of how the claim score for each candidate attorney would impact a cost of a future litigation if litigated by the candidate attorney; and provide the search result interface for display on the client device in response to the request.

17. The computer-readable storage medium of claim 16, wherein the estimated litigation cost is a pseudo-actual litigation cost approximating an actual litigation cost for the claim, and determining the candidate attorney claim score further comprises instructions that cause the processor to:
  determining a typical litigation cost for the claim based on the extracted features and the opposing attorney claim score; and
  computing the candidate attorney claim score based on a difference between the pseudo-actual litigation cost and the typical litigation cost.

18. The computer-readable storage medium of claim 17, wherein the typical litigation cost is determined by an additional machine learned model using the extracted features and the opposing attorney claim score.

19. The computer-readable storage medium of claim 16, wherein determining the estimated litigation cost for the claim further comprises instructions that cause the processor to:
  determining a non-litigation cost for the claim using the machine learned model;
  identifying a total actual cost of the claim; and
  subtracting the non-litigation cost from the total actual cost.

20. The computer-readable storage medium of claim 16, wherein the processor is further configured to execute instructions that cause the processor to:
  while the candidate attorney claim score and the opposing attorney claim score have not converged, redetermining the opposing attorney claim score and the candidate attorney claim score; and
  responsive to determining that the candidate attorney claim score and the opposing attorney claim score have converged, assigning the candidate attorney claim score to the candidate attorney for generating the search result.

* * * * *